US011927275B2

(12) United States Patent
Hayama et al.

(10) Patent No.: US 11,927,275 B2
(45) Date of Patent: Mar. 12, 2024

(54) CAPACITY CONTROL VALVE

(71) Applicant: EAGLE INDUSTRY CO., LTD., Tokyo (JP)

(72) Inventors: Masahiro Hayama, Tokyo (JP); Kohei Fukudome, Tokyo (JP); Takahiro Ejima, Tokyo (JP); Wataru Takahashi, Tokyo (JP); Keigo Shirafuji, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 223 days.

(21) Appl. No.: 17/600,547

(22) PCT Filed: Apr. 2, 2020

(86) PCT No.: PCT/JP2020/015181
§ 371 (c)(1),
(2) Date: Sep. 30, 2021

(87) PCT Pub. No.: WO2020/204136
PCT Pub. Date: Oct. 8, 2020

(65) Prior Publication Data
US 2022/0178358 A1 Jun. 9, 2022

(30) Foreign Application Priority Data

Apr. 3, 2019 (JP) ................................ 2019-071635

(51) Int. Cl.
*F16K 31/06* (2006.01)
*F04B 27/18* (2006.01)
(Continued)

(52) U.S. Cl.
CPC .......... *F16K 31/0613* (2013.01); *F16K 11/22* (2013.01); *F16K 11/24* (2013.01);
(Continued)

(58) Field of Classification Search
CPC .................. F04B 27/1804; F04B 27/18; F04B 2027/1813; F04B 2027/1827;
(Continued)

(56) References Cited

U.S. PATENT DOCUMENTS 2,617,621 A  11/1952 James ..................... F16K 41/10
3,787,023 A   1/1974 Shufflebarger .......... F16K 41/10
(Continued)

FOREIGN PATENT DOCUMENTS

EP  1081378  3/2001  ............. F04B 27/18
EP  2594794  5/2013  ............. F04B 27/18
(Continued)

OTHER PUBLICATIONS

International Search Report and Written Opinion issued in PCT/JP2019/002207, dated Apr. 23, 2019, with English translation, 13 pages.
(Continued)

*Primary Examiner* — Charles G Freay
*Assistant Examiner* — David N Brandt
(74) *Attorney, Agent, or Firm* — HAYES SOLOWAY P.C.

(57) ABSTRACT

A capacity control valve includes a valve housing provided a discharge port through which a discharge fluid of discharge pressure Pd passes, a suction port through which a suction fluid of suction pressure Ps passes, and a control port through which a control fluid of control pressure Pc passes, a rod configured to be driven by a solenoid, a main valve formed by a main valve seat and a main valve element and configured for opening and closing a communication between the discharge port and the control port in accordance with a movement of the rod, and a CS valve provided between the control port and the suction port and controlled by a dynamic pressure of a fluid flowing from the discharge port to the control port at an opening state of the main valve.

4 Claims, 5 Drawing Sheets

(51) Int. Cl.
  *F16K 11/22* (2006.01)
  *F16K 11/24* (2006.01)
  *F16K 31/122* (2006.01)

(52) U.S. Cl.
  CPC .. *F16K 31/1221* (2013.01); *F04B 2027/1813* (2013.01); *F04B 2027/1827* (2013.01); *F04B 2027/1831* (2013.01); *F04B 2027/1868* (2013.01); *F04B 2027/1881* (2013.01)

(58) Field of Classification Search
  CPC ...... F04B 2027/1831; F04B 2027/1868; F04B 2027/1881; F04B 2027/1886; F16K 11/10; F16K 11/22; F16K 11/24; F16K 31/0613; F16K 31/1221; F16K 31/1226
  See application file for complete search history.

(56) References Cited

U.S. PATENT DOCUMENTS

| | | |
|---|---|---|
| 4,166,607 A | 9/1979 | Webb .................. F16K 1/10 |
| 6,010,312 A | 1/2000 | Suitou et al. ........... F04B 1/26 |
| 6,062,823 A | 5/2000 | Kawaguchi ........ F04B 27/1804 |
| 6,354,811 B1 | 3/2002 | Ota et al. ................... 417/222.2 |
| 6,358,017 B1 | 3/2002 | Ota et al. ................... 417/222.2 |
| 6,361,283 B1 | 3/2002 | Ota et al. ................... 417/222.2 |
| 6,485,267 B1 | 11/2002 | Imai et al. .............. F04B 1/26 |
| 6,772,990 B2 | 8/2004 | Sasaki ................ F16K 31/0627 |
| 8,021,124 B2 | 9/2011 | Umemura et al. ........ 417/222.2 |
| 8,079,827 B2 | 12/2011 | Iwa et al. .................... 417/222.2 |
| 8,757,988 B2 | 6/2014 | Fukudome .......... F04B 27/1804 |
| 9,132,714 B2 | 9/2015 | Futakuchi .......... B60H 1/00485 |
| 9,523,987 B2 | 12/2016 | Fukudome .......... G05D 7/0106 |
| 9,568,108 B2 | 2/2017 | Takahashi ............ F16J 15/3496 |
| 9,732,874 B2 | 8/2017 | Saeki .................. F04B 27/1804 |
| 9,777,863 B2 | 10/2017 | Higashidozono ... F04B 27/1804 |
| 9,964,102 B2 | 5/2018 | Kondo ................ F04B 27/1045 |
| 10,697,548 B2 | 6/2020 | Iguchi .................... F16J 15/34 |
| 10,781,804 B2 | 9/2020 | Higashidozono et al. .................. F04B 27/18 |
| 10,883,606 B2 | 1/2021 | Takigahria ........... F16J 15/3452 |
| 11,053,933 B2 | 7/2021 | Warren ............... F04B 27/1804 |
| 11,085,431 B2 | 8/2021 | Fukudome ............ F04B 27/18 |
| 11,156,301 B2 | 11/2021 | Hayama .............. F16K 31/0627 |
| 11,326,585 B2 | 5/2022 | Hayama et al. .... F04B 27/1009 |
| 11,359,624 B2 | 6/2022 | Kurihara et al. ........ F04B 49/12 |
| 2004/0060604 A1 | 4/2004 | Uemura et al. ............... 137/595 |
| 2005/0035321 A1 | 2/2005 | Uemura ................ F16K 27/041 |
| 2005/0287014 A1 | 12/2005 | Umemura ........... F04B 27/1804 |
| 2006/0218953 A1 | 10/2006 | Hirota ........................ 62/228.5 |
| 2007/0214814 A1 | 9/2007 | Umemura et al. ........... 62/228.1 |
| 2008/0138213 A1* | 6/2008 | Umemura ........... F04B 27/1804 137/625.65 |
| 2009/0108221 A1 | 4/2009 | Umemura ........... F04B 27/1804 |
| 2009/0183786 A1 | 7/2009 | Iwa et al. .................... 137/487.5 |
| 2012/0198992 A1* | 8/2012 | Futakuchi ........... F04B 27/1804 91/505 |
| 2012/0198993 A1 | 8/2012 | Fukudome et al. .... F04B 27/18 |
| 2013/0126017 A1* | 5/2013 | Ota .................... F04B 27/1804 137/487.5 |
| 2014/0130916 A1 | 5/2014 | Saeki .................. F04B 27/1804 |
| 2015/0004010 A1 | 1/2015 | Saeki .................. F04B 27/1804 |
| 2015/0010410 A1 | 1/2015 | Saeki et al. ......... F04B 27/1804 |
| 2015/0068628 A1 | 3/2015 | Iwa et al. ................ F16K 31/06 |
| 2015/0211506 A1 | 7/2015 | Shirafuji et al. .... F04B 27/1804 |
| 2015/0345655 A1 | 12/2015 | Higashidozono et al. .................. F16K 31/0624 |
| 2016/0290326 A1 | 10/2016 | Sugamura ........... F04B 27/1804 |
| 2017/0175726 A1 | 6/2017 | Kume ................. F04B 27/1804 |
| 2017/0028462 A1 | 10/2017 | Hayama et al. ......... F16K 47/06 |
| 2017/0284562 A1 | 10/2017 | Hayama ................... F16K 47/06 |
| 2017/0356430 A1 | 12/2017 | Irie et al. ............ F04B 27/1804 |
| 2018/0291888 A1 | 10/2018 | Tonegawa ............ F16K 31/0624 |
| 2020/0362974 A1 | 11/2020 | Hayama ................ F04B 49/22 |
| 2021/0285433 A1 | 9/2021 | Hayama .............. F04B 27/1804 |
| 2022/0034414 A1 | 2/2022 | Ito ............................ F04B 27/18 |

FOREIGN PATENT DOCUMENTS

| | | | |
|---|---|---|---|
| EP | 2784320 | 10/2014 | ............ F04B 27/18 |
| EP | 3431760 | 1/2019 | ............ F04B 27/18 |
| JP | 5-306679 | 11/1993 | ............ F04B 27/08 |
| JP | 6-200875 | 7/1994 | ............ F04B 27/08 |
| JP | 7-27049 | 1/1995 | ............ F04B 27/10 |
| JP | 9-144929 | 6/1997 | ............ F16K 31/06 |
| JP | 10-148258 | 6/1998 | ............... F16J 3/04 |
| JP | 2000-345961 | 12/2000 | ............ F04B 27/14 |
| JP | 2001-73939 | 3/2001 | ............ F04B 27/14 |
| JP | 2001-132632 | 5/2001 | ............ F04B 27/14 |
| JP | 2003-42062 | 2/2003 | ............ F04B 27/14 |
| JP | 2006-52648 | 2/2006 | ............ F04B 27/14 |
| JP | 2006-307828 | 11/2006 | ............ F04B 27/14 |
| JP | 2007-247512 | 9/2007 | ............ F04B 27/14 |
| JP | 2008-14269 | 1/2008 | ............ F04B 27/14 |
| JP | 2008-202572 | 9/2008 | ............ F04B 27/14 |
| JP | 4242624 | 1/2009 | ............ F04B 49/00 |
| JP | 2011-32916 | 2/2011 | ............ F04B 27/14 |
| JP | 4700048 | 3/2011 | ............ F04B 49/00 |
| JP | 5167121 | 12/2012 | ............ F04B 27/14 |
| JP | 2014-118939 | 6/2014 | ............ F04B 27/14 |
| JP | 5557901 | 6/2014 | ............ F04B 27/14 |
| JP | 2014-190247 | 10/2014 | ............ F04B 27/14 |
| JP | 2016-196876 | 11/2016 | ............ F04B 27/18 |
| JP | 2017-129042 | 7/2017 | ............ F04B 27/18 |
| JP | 6206274 | 10/2017 | ............ F04B 27/18 |
| JP | 2017-223348 | 12/2017 | ............ F16K 11/10 |
| JP | 2018-21646 | 2/2018 | ............ F16K 31/06 |
| JP | 2018-40385 | 3/2018 | ............ F16K 31/06 |
| JP | 2018-145877 | 9/2018 | ............ F04B 39/14 |
| JP | 2019-2384 | 1/2019 | ............ F04B 27/18 |
| WO | WO2007119380 | 10/2007 | ............ F04B 27/14 |
| WO | WO2011021789 | 2/2011 | ............ F04B 27/14 |
| WO | WO2011135911 | 11/2011 | ............ F04B 27/14 |
| WO | WO2013109005 | 7/2013 | ............ F04B 49/06 |
| WO | WO2013176012 | 11/2013 | ............ F04B 27/14 |
| WO | WO2014091975 | 6/2014 | ............ F04B 27/14 |
| WO | WO2014119594 | 8/2014 | ............ F04B 27/14 |
| WO | WO2016104390 | 6/2016 | ............ F16K 31/06 |
| WO | WO2017057160 | 4/2017 | ............ F04B 27/18 |
| WO | WO2017159553 | 9/2017 | ............ F04B 27/18 |
| WO | WO2019167912 | 9/2018 | ............ F04B 27/18 |
| WO | WO2018207461 | 11/2018 | ............ F04B 27/18 |

OTHER PUBLICATIONS

International Preliminary Report on Patentability issued in PCT/JP2019/002207, dated Jul. 28, 2020, 7 pages.
International Search Report and Written Opinion issued in PCT/JP2019/005200, dated Apr. 23, 2019, with English translation, 12 pages.
International Preliminary Report on Patentability issued in PCT/JP2019/005200, dated Aug. 18, 2020, 7 pages.
International Search Report and Written Opinion issued in PCT/JP2019/007187, dated Apr. 23, 2019, with English translation, 16 pages.
International Preliminary Report on Patentability issued in PCT/JP2019/007187, Sep. 3, 2020, 8 pages.
International Search Report and Written Opinion issued in PCT/JP2019/020196, dated Aug. 27, 2019, with English translation, 11 pages.
International Preliminary Report on Patentability issued in PCT/JP2019/020196, dated Nov. 24, 2020, with English translation, 6 pages.
International Search Report and Wiitten Opinion issued in PCT/JP2019/005199, dated Apr. 23, 2019, with English translation. 12 pages.
International Preliminary Report on Patentability issued in PCT/JP2019/005199, dated Aug. 18, 2020, 4 pages.
International Search Report and Written Opinion issued in PCT/JP2019/027112, dated Oct. 15, 2019, with English translation, 10 pages.
International Preliminary Report on Patentability issued in PCT/JP2019/027112, dated Jan. 19, 2021, 4 pages.

(56) References Cited

OTHER PUBLICATIONS

International Search Report and Written Opinion issued in PCT/JP2019/027071, dated Oct. 15, 2019, with English translation, 12 pages.
International Preliminary Report on Patentability issued in PCT/JP2019/027071, dated Jan. 12, 2021, 4 pages.
International Search Report and Written Opinion issued in PCT/JP2019/027072, dated Oct. 8, 2019, with English translation, 10 pages.
International Preliminary Report on Patentability issued in PCT/JP2019/027072, dated Jan. 12, 2021, 4 pages.
International Search Report and Written Opinion issued in PCT/JP2019/027073, dated Oct. 15, 2019, with English translation, 10 pages.
International Preliminary Report on Patentability issued in PCT/JP2019/027073, dated Jan. 12, 2021, 4 pages.
International Search Report and Written Opinion issued in PCT/JP2019/031067, dated Oct. 15, 2019, with English translation, 18 pages.
International Preliminary Report on Patentability issued in PCT/JP2019/031067, dated Feb. 9, 2021, 6 pages.
International Search Report and Written Opinion issued in PCT/JP2019/031068, dated Oct. 15, 2019, with English translation, 13 pages.
International Preliminary Report on Patentability issued in PCT/JP2019/031068, dated Feb. 9, 2021, 5 pages.
International Search Report and Written Opinion issued in PCT/JP2019/031069, dated Oct. 15, 2019, with English translation, 12 pages.
International Preliminary Report on Patentability issued in PCT/JP2019/031069, dated Feb. 9, 2021, 4 pages.
International Search Report and Written Opinion issued in PCT/JP2019/043374, dated Jan. 7, 2020, with English translation, 10 pages.
International Preliminary Report on Patentability issued in PCT/JP2019/043374, dated May 11, 2021, 4 pages.
International Search Report and Written Opinion issued in PCT/JP2019/047192, dated Jun. 11, 2020, with English translation, 15 pages.
International Preliminary Report on Patentability issued in PCT/JP2019/047192, dated Jun. 8, 2021, 4 pages.
International Search Report and Written Opinion issued in PCT/JP2020/001443, dated Mar. 31, 2020, with English translation, 15 pages.
International Preliminary Report on Patentability issued in PCT/JP2020/001443, dated Jul. 29, 2021, 8 pages.
International Search Report and Written Opinion issued in PCT/JP2020/007953, dated Apr. 7, 2020, with English translation, 17 pages.
International Preliminary Report on Patentability issued in PCT/JP2020/007953, dated Sep. 16, 2021, 10 pages.
International Search Report and Written Opinion issued in PCT/JP2020/015181, dated Jun. 16, 2020, with English translation, 11 pages.
International Preliminary Report on Patentability issued in PCT/JP2020/015181, dated Oct. 14, 2021, 5 pages.
International Search Report and Written Opinion issued in PCT/JP2020/015175, dated Jun. 23, 2020, with English translation, 13 pages.
International Preliminary Report on Patentability issued in PCT/JP2020/015175, dated Oct. 14, 2021, 6 pages.
US Official Action issued in related U.S. Appl. No. 17/259,138, dated Jan. 18, 2022, 14 pages.
Chinese Official Action issued in related application serial No. 202080016397.7, dated Aur. 3, 2022, with translation, 10 pages.
Chinese Official Action issued in related application serial No. 202080007416.X, dated Jul. 28, 2022, with translation, 9 pages.
European Official Action issued in related application serial No. 20782597.7, dated Oct. 19, 2022, 5 pages.
U.S. Official Action issued in related U.S. Appl. No. 17/256,955, dated Aug. 23, 2022, 17 pages.
U.S. Official Action issued in related U.S. Appl. No. 17/299,285, dated Mar. 31, 2022, 11 pages.
U.S. Notice of Allowance issued in related U.S. Appl. No. 17/256,959, dated Sep. 7, 2022, 13 pages.
www.lexico.com/en/definition/connected accessed Aug. 15, 2022, Year 2022.
International Search Report and Written Opinion issued in PCT/JP2021/015598, dated Jun. 15, 2021, With English translation, 13 pages.
International Preliminary Report on Patentability issued in PCT/JP2021/015598, dated Oct. 25, 2022, 5 pages.
Chinese Official Action issued in related application serial No. 20208002678.6, dated Oct. 9, 2022, with translation, 9 pages.
Chinese Official Action issued in related application serial No. 201980046750.3, dated Nov. 3, 2022, with translation, 11 pages.
European Official Action issued in related application serial No. 20744724.4, dated Sep. 16, 2022, 8 pages.
European Official Action issued in related application serial No. 20765478.1, dated Nov. 3, 2022, 7 pages.
European Official Action issued in related application serial No. 20783639.6, dated Nov. 22, 2022, 8 pages.
Chinese Official Action issued in related application serial No. 201980044409.4, dated Jan. 26, 2022, with translation, 10 pages.
Chinese Official Action issued in related application serial No. 201980044138.2, dated Mar. 30, 2022, with translation, 9 pages.
Chinese Official Action issued in related application serial No. 201980044077.x, dated Apr. 2, 2022, with translation, 11 pages.
Chinese Official Action issued in related application serial No. 201980046798.4, dated Apr. 6, 2022, with trarnslation, 8 pages.
Chinese Official Action issued in related application serial No. 201980046750.3, dated Apr. 27, 2022, with trarnslation, 10 pages.
Chinese Official Action issued in related application serial No. 201980047614.6, dated Apr. 26, 2022, with trarnslation, 8 pages.
European Search Report issued in related application serial No. 19848099.8, dated Feb. 9, 2022, 7 pages.
European Search Report issued in related application serial No. 19834984.7, dated Feb. 21, 2022, 12 pages.
European Search Report issued in related application serial No. 19833331.2, dated Mar. 30, 2022, 6 pages.
European Search Report issued in related application serial No. 19847690.5, dated Feb. 9, 2022, 5 pages.
European Search Report issued in related application serial No. 19847395.1, dated Feb. 8, 2022, 5 pages.
European Search Report issued in related application serial No. 19834556.3, dated Feb. 17, 2022, 7 pages.
European Search Report issued in related application serial No. 19833028.4, dated Apr. 7, 2022, 8 pages.
European Search Report issued in related application serial No. 19894059.5, dated Jun. 7, 2022, 4 pages.
European Search Report issued in related application serial No. 19883193.5, dated May 23, 2022, 5 pages.
U.S. Official Action issued in related U.S. Appl. No. 17/256,953, dated Apr. 15, 2022, 18 pages.
U.S. Official Action issued in related U.S. Appl. No. 17/259,138, dated Mar. 31, 2022, 5 pages.
U.S. Official Action issued in related U.S. Appl. No. 17/256,955, dated Feb. 18, 2022, 19 pages.
U.S. Official Action issued in related U.S. Appl. No. 17/259,138, dated Jan. 19, 2022, 6 pages.
U.S. Official Action issued in related U.S. Appl. No. 17/256,959, dated May 5, 2022, 18 pages.
U.S. Official Action issued in related U.S. Appl. No. 17/433,558, dated May 25, 2022, 11 pages.
Chinese Official Action issued in related application serial No. 201980046798.4, dated Dec. 5, 2022, with translation, 13 pages.
Chinese Official Action issued in related application serial No. 201980046750.3, dated Mar. 1, 2023, with translation, 12 pages.
Chinese Official Action issued in related application serial No. 202080026386.7, dated Oct. 31, 2022, with translation, 8 pages.
European Official Action issued in related application serial No. 19847690.5, dated Jul. 10, 2023, 4 pages.

(56) References Cited

OTHER PUBLICATIONS

U.S. Official Action issued in related U.S. Appl. No. 17/599,539, dated Apr. 25, 2023, 6 pages.
Notice of Allowance issued in related U.S. Appl. No. 17/287,086, dated Feb. 2, 2022, 7 pages.
Notice of Allowance issued in related U.S. Appl. No. 17/599,539, dated Jul. 25, 2023, 4 pages.
U.S. Appl. No. 17/256,953, filed Dec. 29, 2020.
U.S. Appl. No. 17/299,285, filed Jun. 2, 2021.
U.S. Appl. No. 17/256,959, filed Dec. 29, 2020.
U.S. Appl. No. 17/287,086, filed Apr. 20, 2021.
U.S. Appl. No. 17/417,701, filed Jun. 23, 2021.
U.S. Appl. No. 17/258,692, filed Jan. 7, 2021.
U.S. Appl. No. 17/256,955, filed Dec. 29, 2020.
U.S. Appl. No. 17/433,558, filed Aug. 24, 2021.
U.S. Appl. No. 17/256,947, filed Dec. 29, 2020.
U.S. Appl. No. 17/258,708, filed Jan. 7, 2021.
U.S. Appl. No. 17/259,138, filed Jan. 8, 2021.
U.S. Appl. No. 17/600,547, filed Sep. 30, 2021.
U.S. Appl. No. 17/599,539, filed Sep. 28, 2021.
U.S. Official Action issued in related U.S. Appl. No. 17/417,701, dated Aug. 2, 2023, 11 pages.
U.S. Official Action issued in related U.S. Appl. No. 17/258,692, dated Aug. 3, 2023, 8 pages.
U.S. Official Action issued in related U.S. Appl. No. 17/258,708, dated Sep. 25, 2023, 5 pages.
Notice of Allowance issued in related U.S. Appl. No. 17/258,692, dated Sep. 27, 2023, 5 pages.

\* cited by examiner

CAPACITY CONTROL VALVE

TECHNICAL FIELD

The present invention relates to a capacity control valve that variably controls capacity of a working fluid, for example, a capacity control valve that controls a discharge amount of a variable displacement compressor used for an air conditioning system of an automobile in accordance with pressure.

BACKGROUND ART

A variable displacement compressor used for an air conditioning system of an automobile, etc. includes a rotating shaft to be driven and rotated by an engine, a swash plate coupled to the rotating shaft in such a manner that a tilt angle is variable, compressing pistons coupled to the swash plate, etc., and by changing the tilt angle of the swash plate, changes a stroke amount of the pistons to control a discharge amount of a fluid. This tilt angle of the swash plate can be continuously changed by appropriately controlling pressure in a control chamber while utilizing suction pressure Ps of a suction chamber that suctions the fluid, discharge pressure Pd of a discharge chamber that discharges the fluid pressurized by the pistons, and control pressure Pc of the control chamber that houses the swash plate, with using a capacity control valve to be driven to open and close by electromagnetic force.

At the time of continuously driving the variable displacement compressor (hereinafter, sometimes simply referred to as "at the time of continuous driving"), the capacity control valve performs normal control in which energization is controlled by a control computer, a main valve element is moved in the axial direction by electromagnetic force generated in a solenoid, and a main valve is opened and closed to adjust the control pressure Pc of the control chamber.

At the time of normal control of the capacity control valve, the pressure of the control chamber in the variable displacement compressor is appropriately controlled, and by continuously changing the tilt angle of the swash plate with respect to the rotating shaft, the stroke amount of the pistons is changed to control the discharge amount of the fluid to the discharge chamber. Thus, the air conditioning system is adjusted to have a desired cooling ability.

In such a variable displacement compressor, when the variable displacement compressor is stopped and then left in a stopped state for a long time, the suction pressure Ps, the discharge pressure Pd, and the control pressure Pc become equal pressure, the control pressure Pc and the suction pressure Ps become much higher than the control pressure Pc and the suction pressure Ps at the time of continuous driving, and liquefication may sometimes occur in part of the fluid in the control chamber. At the time of starting up the variable displacement compressor from this state, the control pressure Pc is much higher than the time of continuous driving, and the control chamber is less likely to have the maximum capacity due to the liquefied fluid. Thus, it takes a long time before the discharge amount is controlled to have a target value. From this, there is a capacity control valve with which the liquefied fluid is discharged from the inside of the control chamber of the variable displacement compressor for a short time at the time of start-up of the variable displacement compressor.

A capacity control valve shown in Patent Citation 1 includes a valve housing including a first communication passage which serves as a discharge port providing communication between a first valve chamber in which a first valve seat serving as a main valve seat is formed and a discharge chamber of a variable displacement compressor, a second communication passage which serves as a suction port providing communication between a second valve chamber in which a second valve seat is formed and a suction chamber of the variable displacement compressor, and a third communication passage which serves as a control port providing communication between a third valve chamber which serves as a pressure sensitive chamber formed on the axially opposite side of the second valve chamber with respect to the first valve chamber and a control chamber of the variable displacement compressor, a main valve element integrally having a first valve portion to be connected to and separated from the first valve seat in the first valve chamber to open and close communication between the discharge chamber and the control chamber, and a second valve portion to be connected to and separated from the second valve seat in the second valve chamber to open and close communication between the control chamber and the suction chamber, the main valve element that performs opening and closing actions which are opposite to each other by reciprocation of the valve portions, an intermediary communication passage providing communication between the second valve chamber and the third valve chamber, a pressure sensitive body arranged in the third valve chamber, the pressure sensitive body that applies bias force in the valve opening direction of a main valve to the main valve element in accordance with surrounding fluid pressure, an adapter having an annular sealing surface to be connected to and separated from a pressure sensitive valve seat which is provided in a free end of the pressure sensitive body in the extending and contracting direction integrally with the main valve element to open and close communication between the third valve chamber and the intermediary communication passage, and a solenoid that applies drive force to the main valve element.

At the time of start-up of the variable displacement compressor, when the solenoid of the capacity control valve is energized and the main valve element is moved in the axial direction, the first valve portion closes the main valve and at the same time, the second valve portion opens a second valve. Further, by contracting the pressure sensitive body by the control pressure Pc and the suction pressure Ps which is much higher than the time of continuous driving, and opening the pressure sensitive valve, a flow passage providing communication from the third valve chamber to the second valve chamber is formed in the valve housing by the intermediary communication passage. Since the suction pressure Ps of the suction chamber is lowered following start-up of the variable displacement compressor, the high-pressure liquefied fluid of the control chamber is moved by a pressure difference from the suction chamber, and discharged through the flow passage formed in the valve housing for a short time. Further, by providing an auxiliary communication passage providing communication between the intermediary communication passage and the third valve chamber in the main valve element, the fluid of the control chamber is more easily discharged to the suction chamber at the time of start-up of the variable displacement compressor.

CITATION LIST

Patent Literature

Patent Citation 1: JP 5167121 B2 ([0052], FIG. 4)

SUMMARY OF INVENTION

Technical Problem

However, in Patent Citation 1, by providing the auxiliary communication passage, the second communication passage serving as the suction port and the third communication passage serving as the control port always communicate with each other. At the time of normal control of the capacity control valve, and at the time of opening the main valve, part of the fluid flowing to the third valve chamber through the main valve is discharged to the suction chamber through the auxiliary communication passage, the intermediary communication passage, and the second communication passage. Thus, there is a problem that a control property of the control pressure Pc and energy efficiency are poor.

The present invention is achieved focusing on such a problem, and an object thereof is to provide a capacity control valve with which control precision at the time of normal control is high and energy efficiency is excellent.

Solution to Problem

In order to solve the foregoing problem, a capacity control valve according to the present invention is a capacity control valve including: a valve housing provided with a discharge port through which a discharge fluid of discharge pressure passes, a suction port through which a suction fluid of suction pressure passes, and a control port through which a control fluid of control pressure passes; a rod configured to be driven by a solenoid; a main valve formed by a main valve seat and a main valve element and configured for opening and closing a communication between the discharge port and the control port in accordance with a movement of the rod; and a CS valve provided between the control port and the suction port and controlled by a dynamic pressure of a fluid flowing from the discharge port to the control port at an opening state of the main valve. According to the aforesaid feature of the present invention, at the time of normal operation after start-up of a variable displacement compressor, and at the time of opening the main valve, the CS valve is controlled by the dynamic pressure of the discharge fluid flowing toward the control port through the main valve, and the control fluid of the control pressure is not discharged from the suction port. Thus, control precision at the time of normal control is high and energy efficiency is excellent.

It may be preferable that the control port communicates with a space which is opened and closed by the main valve. According to this preferable configuration, the discharge port and the control port are in a communication state at the time of opening the main valve at the time of non-energization. Thus, it is possible to reliably provide communication between the discharge chamber and the control chamber.

It may be preferable that the CS valve includes a cylindrical CS valve element, and a spring that biases the CS valve element in a valve opening direction of the CS valve. According to this preferable configuration, it is possible to compactly form the capacity control valve having the CS valve. In addition, it is possible to maintain the control pressure and the suction pressure at the same pressure at the time of closing the main valve. Thus, it is possible to maintain a state of the maximum capacity and enhance operation efficiency.

It may be preferable that the CS valve element has a receiving surface extending in a radial direction to receive the dynamic pressure. According to this preferable configuration, the receiving surface crosses the flowing direction of the discharge fluid. Thus, the dynamic pressure is more easily generated by the discharge fluid flowing toward the control port at the time of opening the main valve.

It may be preferable that the CS valve element has a first end surface portion and a second end surface portion on an axially opposite side of the first end surface portion, the first end surface portion is brought into contact with and separated from a CS valve seat formed in the valve housing, and, when biased in the valve opening direction of the CS valve, the second end surface portion is abutted with an inner surface of the valve housing. According to this preferable configuration, it is possible to set the maximum opening area of the CS valve by abutment of the CS valve element with the inner surface of the valve housing. Thus, it is possible to simplify a structure of the CS valve.

It may be preferable that the CS valve also serves as a differential pressure valve provided between the suction pressure and the control pressure. According to this preferable configuration, at the time of opening the main valve, in addition to the dynamic pressure generated by a flow of the discharge fluid, the differential pressure is applied to the CS valve. Thus, the CS valve is reliably operated.

It may be preferable that the capacity control valve further includes a pressure drive valve configured to be opened and closed by the suction pressure, wherein an intermediary communication passage is formed in the main valve element and capable of providing a communication between the control port and the suction port in accordance with an operation of the pressure drive valve. According to this preferable configuration, when the suction pressure is high, the pressure drive valve is opened and the control port communicates with the suction port via the intermediary communication passage. Thus, it is possible to promptly discharge a liquid coolant of the control chamber to the suction chamber at the time of start-up. Thereby, responsiveness at the time of start-up of the variable displacement compressor is excellent.

It may be preferable that the valve housing is provided with another suction port which forms a flow passage to be opened and closed by the pressure drive valve. According to this preferable configuration, by individually providing the suction port forming the flow passage to be opened and closed by the pressure drive valve, and the suction port forming a flow passage to be opened and closed by the CS valve, it is possible to simplify a structure of the valve housing.

DESCRIPTION OF EMBODIMENTS

Modes for carrying out a capacity control valve according to the present invention will be described below based on embodiments.

First Embodiment

A capacity control valve according to a first embodiment of the present invention will be described with reference to FIGS. 1 to 4. Hereinafter, description will be given with the left and right sides seen from the front side of FIG. 2 being the left and right sides of the capacity control valve.

A capacity control valve V of the present invention is assembled into a variable displacement compressor M used for an air conditioning system of an automobile, etc. By variably controlling pressure of a working fluid (hereinafter, simply referred to as the "fluid") serving as a coolant, a discharge amount of the variable displacement compressor M is controlled and the air conditioning system is adjusted to have a desired cooling ability.

Figure 1:
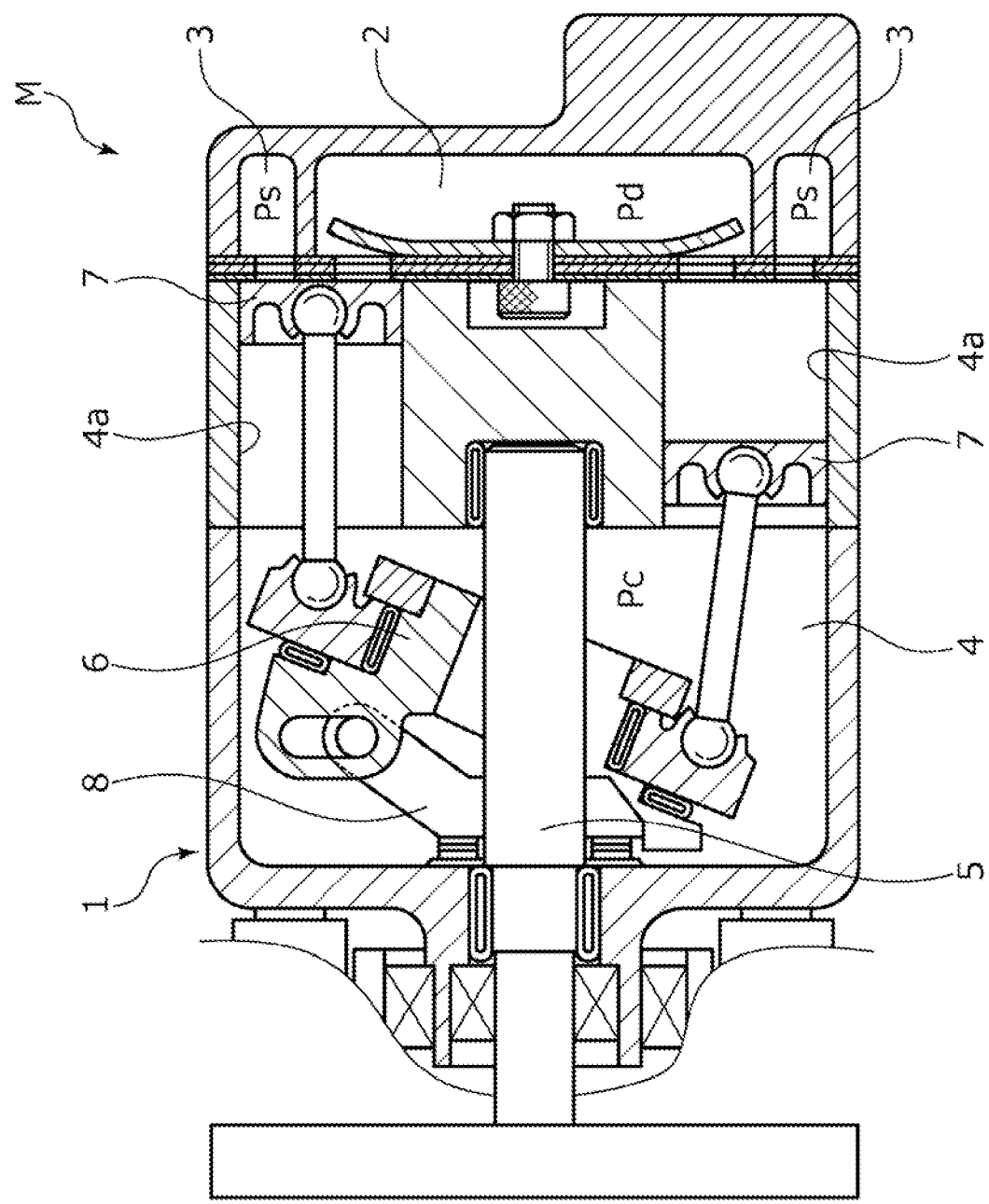
FIG. 1 is a schematic configuration diagram showing a swash plate type variable displacement compressor into which a capacity control valve according to a first embodiment of the present invention is assembled.

First of all, the variable displacement compressor M will be described. As shown in FIG. 1, the variable displacement compressor M has a casing 1 including a discharge chamber 2, a suction chamber 3, a control chamber 4, and plural cylinders 4a. A communication passage (not shown) providing direct communication between the control chamber 4 and the suction chamber 3 is provided in the variable displacement compressor M. A fixed orifice for adjusting to balance pressure between the suction chamber 3 and the control chamber 4 is provided in this communication passage.

The variable displacement compressor M also includes a rotating shaft 5 to be driven and rotated by an engine (not shown) installed outside the casing 1, a swash plate 6 coupled to the rotating shaft 5 in an eccentric state by a hinge mechanism 8 in the control chamber 4, and plural pistons 7 coupled to the swash plate 6 and fitted reciprocatably in the respective cylinders 4a. With using the capacity control valve V to be driven to open and close by electromagnetic force, a tilt angle of the swash plate 6 is continuously changed by appropriately controlling pressure in the control chamber 4 while utilizing suction pressure Ps of the suction chamber 3 that suctions the fluid, discharge pressure Pd of the discharge chamber 2 that discharges the fluid pressurized by the pistons 7, and control pressure Pc of the control chamber 4 that houses the swash plate 6. Thereby, a stroke amount of the pistons 7 is changed to control a discharge amount of the fluid. For convenience of description, the capacity control valve V assembled into the variable displacement compressor M is not shown in FIG. 1.

Specifically, the higher the control pressure Pc in the control chamber 4 is, the smaller the tilt angle of the swash plate 6 with respect to the rotating shaft 5 becomes, and the more the stroke amount of the pistons 7 is reduced. However, when the pressure becomes fixed pressure or more, the swash plate 6 is brought into a substantially perpendicular state with respect to the rotating shaft 5, that is, a state where the swash plate is slightly tilted from the exactly perpendicular state. At this time, the stroke amount of the pistons 7 becomes minimum, and pressurization of the fluid in the cylinders 4a by the pistons 7 becomes minimum. Therefore, the discharge amount of the fluid to the discharge chamber 2 is reduced, and the cooling ability of the air conditioning system becomes minimum. Meanwhile, the lower the control pressure Pc in the control chamber 4 is, the larger the tilt angle of the swash plate 6 with respect to the rotating shaft 5 becomes, and the more the stroke amount of the pistons 7 is increased. However, when the pressure becomes fixed pressure or less, the tilt angle of the swash plate 6 with respect to the rotating shaft 5 becomes maximum. At this time, the stroke amount of the pistons 7 becomes maximum, and the pressurization of the fluid in the cylinders 4a by the pistons 7 becomes maximum. Therefore, the discharge amount of the fluid to the discharge chamber 2 is increased, and the cooling ability of the air conditioning system becomes maximum.

Figure 2:
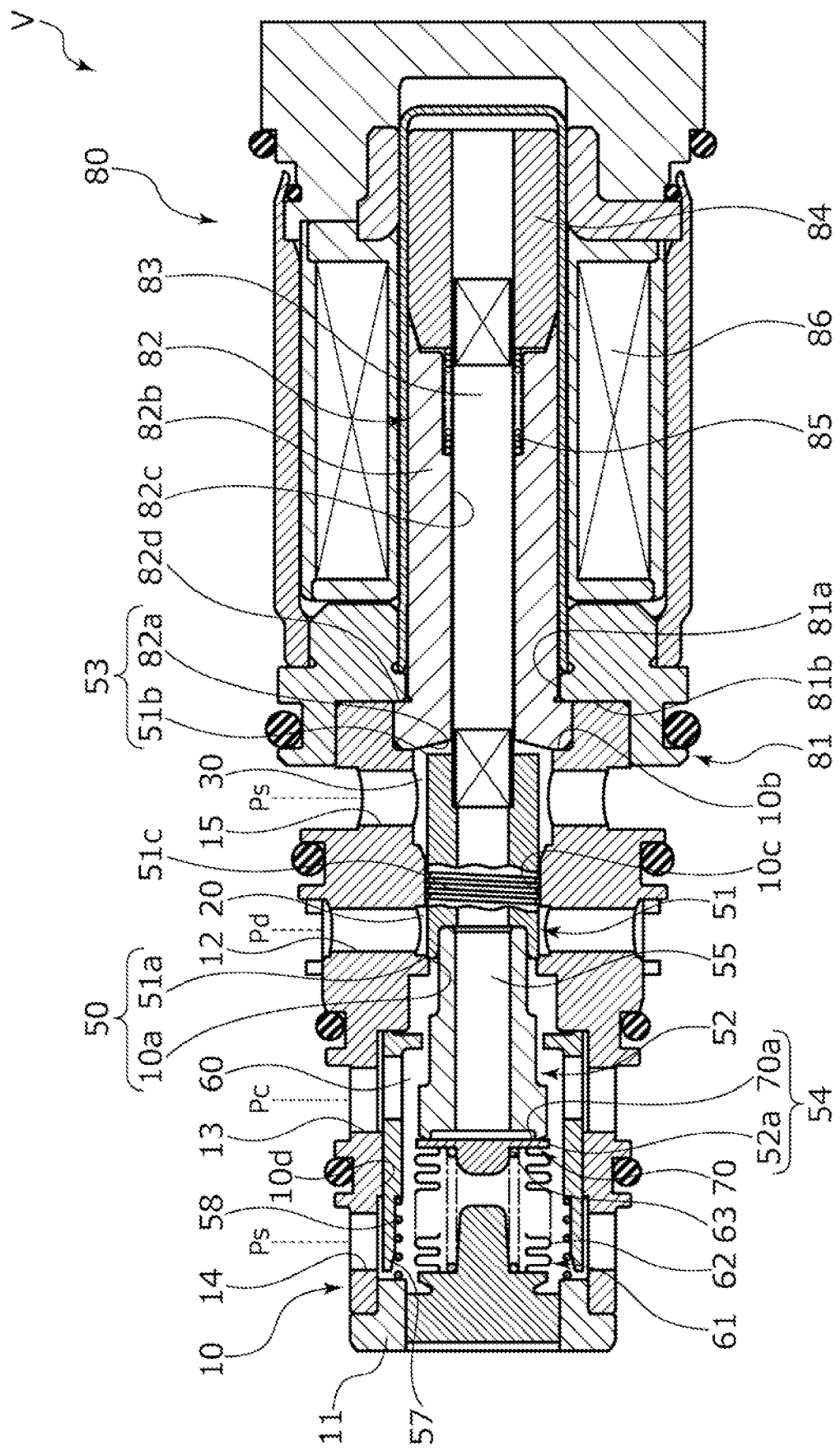
FIG. 2 is a sectional view showing a state where a main valve is closed and a CS valve is opened in an energized state (at the time of normal control) of the capacity control valve according to the first embodiment.

As shown in FIG. 2, the capacity control valve V assembled into the variable displacement compressor M adjusts an electric current energized in a coil 86 forming a solenoid 80 and performs open/close control of a main valve 50 in the capacity control valve V, and also operates a pressure sensitive body 61 by suction pressure Ps in an intermediary communication passage 55 to perform open/close control of a pressure sensitive valve 54 serving as a pressure drive valve, so that by controlling the fluid flowing into the control chamber 4 or flowing out from the control chamber 4, the control pressure Pc in the control chamber 4 is variably controlled. The intermediary communication passage 55 passes through over the axial direction by connecting a main/auxiliary valve element 51 serving as a main valve element and a hollow hole formed inside a pressure sensitive valve member 52, and forms a flow passage for discharging a liquid coolant. In detail, partly due to liquefaction of the fluid whose pressure is increased in the control chamber 4 by leaving the variable displacement compressor M in a stop state for a long time, but by closing the main valve 50 and opening an auxiliary valve 53 by start-up of the variable displacement compressor M and energization of the capacity control valve V, and further by contracting the pressure sensitive body 61 and opening the pressure sensitive valve 54 by high suction pressure Ps in the intermediary communication passage 55, the liquid coolant of the control chamber 4 can be discharged to the suction chamber 3 via the intermediary communication passage 55 for a short time.

In the present embodiment, the main valve 50 is formed by the main/auxiliary valve element 51 and a main valve seat 10a formed on an inner peripheral surface of a valve housing 10, and by connecting and separating an axially left end 51a of the main/auxiliary valve element 51 to and from the main valve seat 10a, the main valve 50 is opened and closed. The auxiliary valve 53 is formed by the main/auxiliary valve element 51 and an auxiliary valve seat 82a formed on the inner diameter side of an axially left end surface which serves as an opening end surface of a center post 82, and by connecting and separating an axially right end 51b of the main/auxiliary valve element 51 to and from the auxiliary valve seat 82a, the auxiliary valve 53 is opened and closed. The pressure sensitive valve 54 is formed by a cap 70 forming the pressure sensitive body 61 and a pressure sensitive valve seat 52a formed in an axially left end of the pressure sensitive valve member 52. By connecting and separating a sealing surface 70a formed on the outer diameter side of an axially right end of the cap 70 to and from the pressure sensitive valve seat 52*a*, the pressure sensitive valve 54 is opened and closed.

Next, a structure of the capacity control valve V will be described. As shown in FIG. 2, the capacity control valve V is mainly formed by the valve housing 10 made of a metal material or a resin material, the main/auxiliary valve element 51 arranged reciprocatably in the axial direction in the valve housing 10, the pressure sensitive valve member 52, a CS valve element 57, the pressure sensitive body 61 that applies axially rightward bias force to the main/auxiliary valve element 51 and the pressure sensitive valve member 52 in accordance with the suction pressure Ps in the intermediary communication passage 55, and the solenoid 80 connected to the valve housing 10, the solenoid that applies drive force to the main/auxiliary valve element 51 and the pressure sensitive valve member 52. The capacity control valve V includes the CS valve element 57, and a CS valve 56 (see FIGS. 3 and 4) can be closed by dynamic pressure of the fluid flowing through the main valve 50 at the time of opening the main valve 50.

In the present embodiment, the CS valve 56 is formed by the CS valve element 57 and a CS valve seat 11*a* (see FIGS. 3 and 4) formed on an axially right end surface of a partition adjusting member 11 which is attached to the valve housing 10. By connecting and separating an end surface portion 57*a* formed in an axially left end of the CS valve element 57 to and from the CS valve seat 11*a*, the CS valve 56 is opened and closed.

As shown in FIG. 2, the solenoid 80 is mainly formed by a casing 81 having an opening portion 81*a* which is open on the axially left side, the substantially cylindrical center post 82 inserted into the opening portion 81*a* of the casing 81 from the axially left side and fixed on the inner diameter side of the casing 81, a drive rod 83 serving as a rod which is inserted into the center post 82 reciprocatably in the axial direction, the drive rod whose axially left end portion is inserted and fixed to the main/auxiliary valve element 51, a movable iron core 84 to which an axially right end portion of the drive rod 83 is inserted and fixed, a coil spring 85 provided between the center post 82 and the movable iron core 84, the coil spring biasing the movable iron core 84 to the axially right side which is the valve opening direction of the main valve 50, and the excitation coil 86 wound on the outside of the center post 82 via a bobbin.

A recessed portion 81*b* in which the inner diameter side of an axially left end is recessed to the axially right side is formed in the casing 81. An axially right end portion of the valve housing 10 is inserted and fixed to this recessed portion 81*b* in a substantially sealed manner.

The center post 82 is made of a rigid body which is a magnetic material such as iron or silicon steel, and includes a cylindrical portion 82*b* extending in the axial direction, the cylindrical portion where an insertion hole 82*c* into which the drive rod 83 is inserted is formed, and an annular flange portion 82*d* extending in the outer diameter direction from an outer peripheral surface of an axially left end portion of the cylindrical portion 82*b*. The auxiliary valve seat 82*a* is formed on the inner diameter side of the opening end surface of the center post 82, that is, on an axially left end surface of the cylindrical portion 82*b*.

The center post 82 is inserted and fixed to a recessed portion 10*b* recessed to the axially left side on the inner diameter side of an axially right end of the valve housing 10 which is inserted and fixed to the recessed portion 81*b* of the casing 81 in a substantially sealed manner in a state where an axially right end surface of the flange portion 82*d* is abutted with a bottom surface of the recessed portion 81*b* of the casing 81 from the axially left side.

As shown in FIG. 2, a Pd port 12 serving as a discharge port which communicates with the discharge chamber 2 of the variable capacity compressor M, a Pc port 13 serving as a control port which communicates with the control chamber 4 of the variable displacement compressor M, a first Ps port 14 serving as a suction port which communicates with the suction chamber 3 of the variable displacement compressor M, and a second Ps port 15 adjacent to the axially right side of the Pd port 12, the second Ps port communicating with the suction chamber 3 of the variable displacement compressor M are formed in the valve housing 10.

The valve housing 10 is formed in a substantially cylindrical bottomed shape by press-fitting the partition adjusting member 11 to an axially left end portion in a substantially sealed manner. The partition adjusting member 11 can adjust the bias force of the pressure sensitive body 61 and bias force of a coil spring 58 of the CS valve 56 to be described later by adjusting an installment position of the valve housing 10 in the axial direction.

A first valve chamber 20 communicating with the Pd port 12 where the axially left end 51*a* side of the main/auxiliary valve element 51 is arranged, a second valve chamber 30 communicating with the second Ps port 15 where the back pressure side, that is, the axially right end 51*b* side of the main/auxiliary valve element 51 is arranged, and a pressure sensitive chamber 60 communicating with the Pc port 13 and the first Ps port 14 where the CS valve element 57 and the pressure sensitive body 61 are arranged are formed inside the valve housing 10.

The main/auxiliary valve element 51 and the pressure sensitive valve member 52 inserted and fixed to this main/auxiliary valve element 51 are arranged reciprocatably in the axial direction inside the valve housing 10. A small-diameter guide hole 10*c* with which an outer peripheral surface of the main/auxiliary valve element 51 is capable of being in sliding contact in a substantially sealed state is formed in an axially right end portion on the inner peripheral surface of the valve housing 10. Further, inside the valve housing 10, the first valve chamber 20 and the second valve chamber 30 are partitioned by the outer peripheral surface of the main/auxiliary valve element 51 and an inner peripheral surface of the guide hole 10*c*. A tiny gap is formed between the inner peripheral surface of the guide hole 10*c* and the outer peripheral surface of the main/auxiliary valve element 51 by slightly separating the surfaces from each other in the radial direction. The main/auxiliary valve element 51 is smoothly relatively movable in the axial direction with respect to the valve housing 10.

Inside the valve housing 10, the CS valve element 57 is arranged reciprocatably in the axial direction in the pressure sensitive chamber 60. A small-diameter guide hole 10*d* on which an outer peripheral surface of the CS valve element 57 is slidable in a substantially sealed state is formed in an axially left end portion on the inner peripheral surface of the valve housing 10.

As shown in FIG. 2, the main/auxiliary valve element 51 is formed in a substantially cylindrical shape. The pressure sensitive valve member 52 of a separate body formed in a stepped cylindrical shape and a substantially artillery battery shape when seen from the side is inserted and fixed to an axially left end portion of the main/auxiliary valve element 51 in a substantially sealed manner, and the drive rod 83 is inserted and fixed to an axially right end portion in a substantially sealed manner. These are movable in the axial direction.

By a labyrinth effect of an annular groove 51c serving as a seal portion which is formed on the outer peripheral surface of the main/auxiliary valve element 51, it is possible to suppress leakage of the fluid from the first valve chamber 20 to the second valve chamber 30. Thus, the discharge pressure Pd of the discharge fluid supplied from the discharge chamber 2 to the first valve chamber 20 via the Pd port 12 is maintained.

Figure 3:
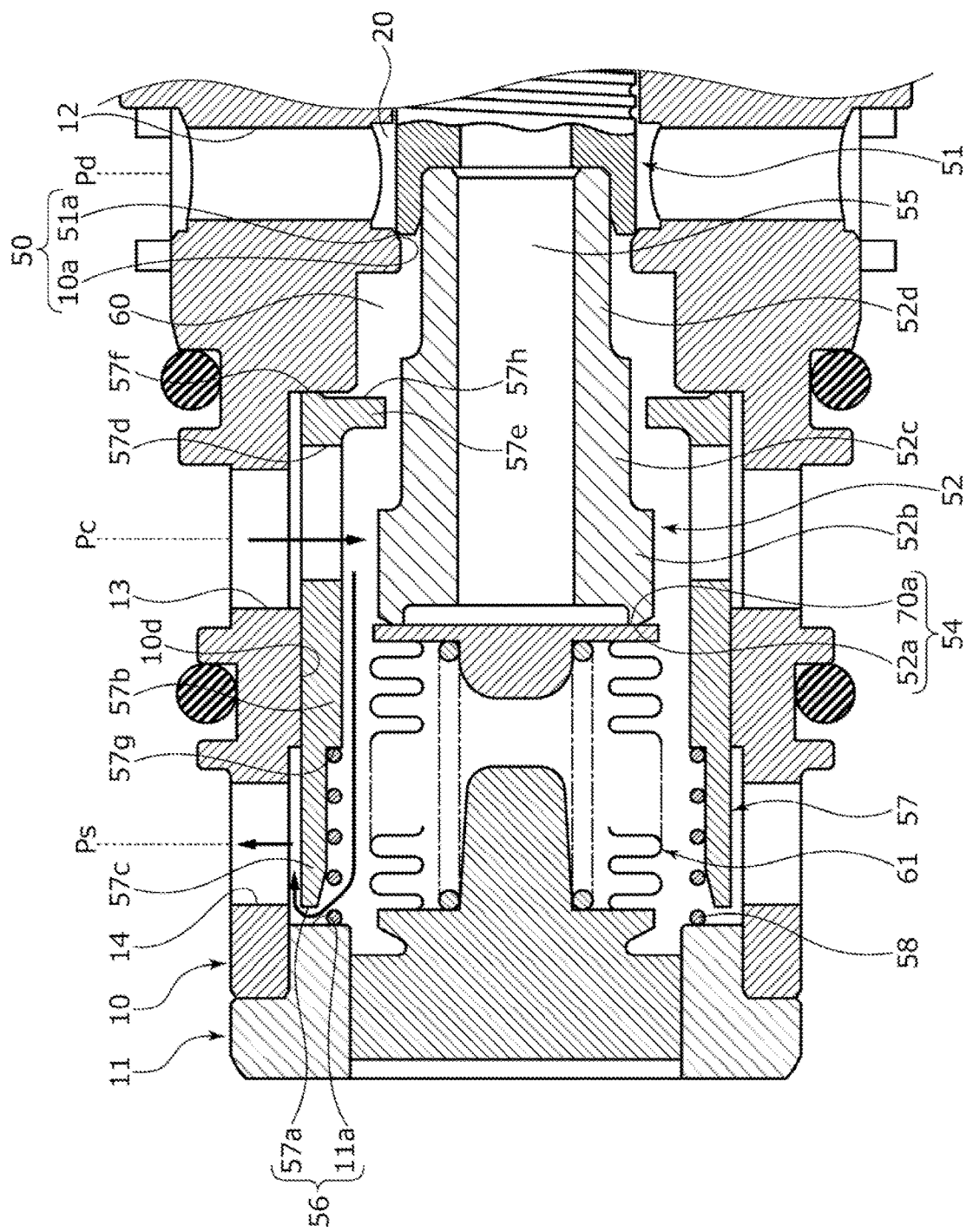
FIG. 3 is an enlarged sectional view of FIG. 2 showing the state where the main valve is closed and the CS valve is opened in an energized state (at the time of normal control) of the capacity control valve according to the first embodiment.
Figure 4:
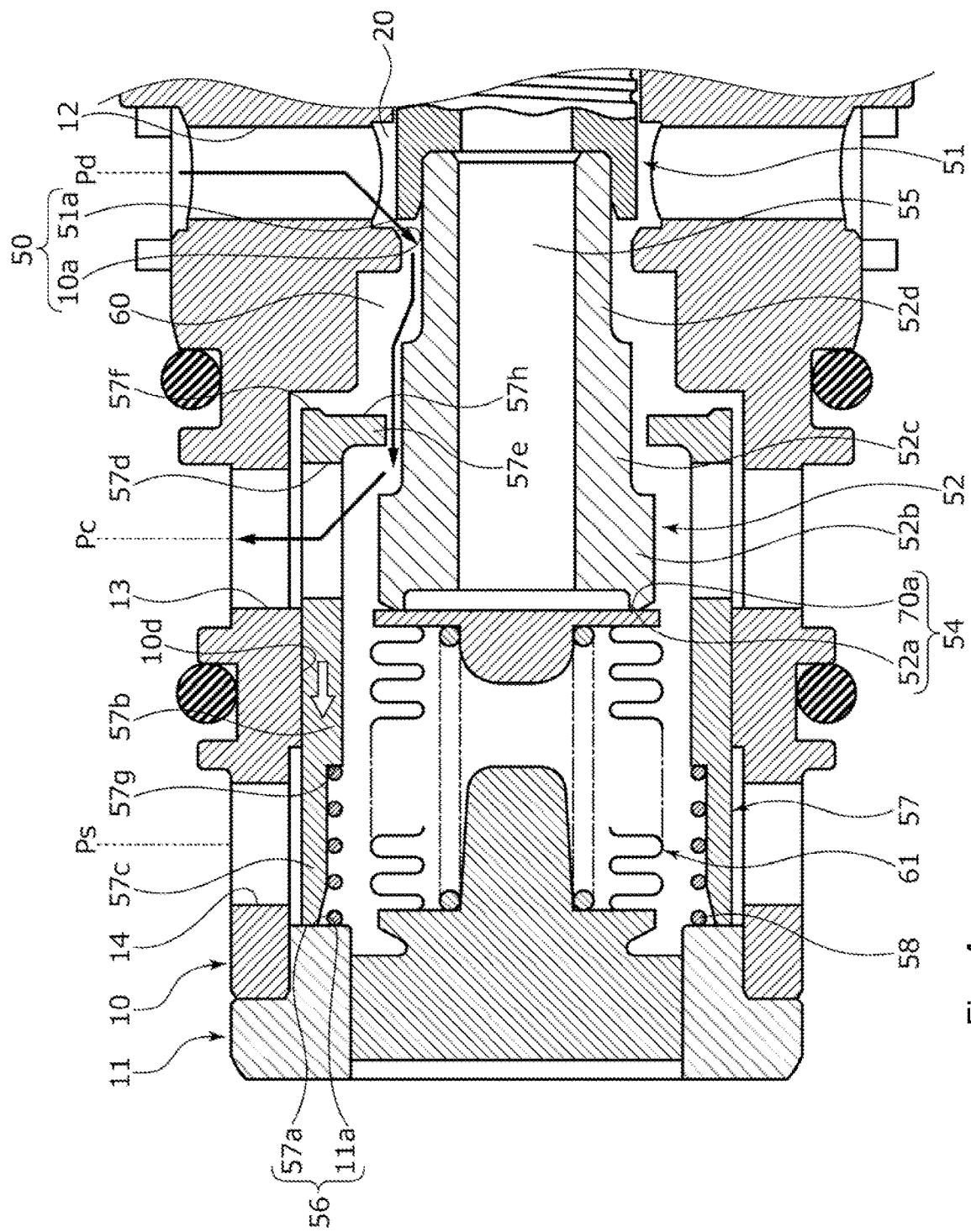
FIG. 4 is an enlarged sectional view showing a state where the main valve is opened and the CS valve is closed in a non-energized state of the capacity control valve according to the first embodiment.

As shown in FIGS. 3 and 4, the pressure sensitive valve member 52 is formed in a stepped substantially-cylindrical shape by a large diameter portion 52b in which the pressure sensitive valve seat 52a is formed, a middle diameter portion 52c formed on the axially right side of the large diameter portion 52b to have a smaller diameter than the large diameter portion 52b, and a small diameter portion 52d formed on the axially right side of the middle diameter portion 52c to have a smaller diameter than the middle diameter portion 52c, the small diameter portion onto which the main/auxiliary valve element 51 formed in a substantially cylindrical shape is fitted in a substantially sealed manner.

As shown in FIG. 2, the pressure sensitive body 61 is mainly formed by a bellows core 62 in which a coil spring 63 is built, and the disc-shaped cap 70 provided in an axially right end of the bellows core 62, and an axially left end of the bellows core 62 is fixed to the partition adjusting member 11.

The pressure sensitive body 61 is arranged in the pressure sensitive chamber 60. By bias force to move the cap 70 to the axially right side by the coil spring 63 and the bellows core 62, the sealing surface 70a of the cap 70 is seated on the pressure sensitive valve seat 52a of the pressure sensitive valve member 52. Force of moving the cap 70 to the axially left side in accordance with the suction pressure Ps in the intermediary communication passage 55 is applied to the cap 70.

As shown in FIGS. 3 and 4, the CS valve element 57 is formed in a substantially cylindrical shape, and arranged in a concentric manner in the pressure sensitive chamber 60 on the radially outer side of the pressure sensitive body 61. The coil spring 58 serving as a spring is fitted into an attachment portion 57c formed in an axially left end portion of the CS valve element 57. An axially left end of the coil spring 58 is abutted with the axially right end surface of the partition adjusting member 11, and an axially right end of the coil spring 58 is abutted with a side surface 57g extending in the radial direction of an axially right end of the attachment portion 57c.

In detail, the CS valve element 57 has a substantially cylindrical base portion 57b, the attachment portion 57c formed in an axially left end portion of the base portion 57b, the attachment portion whose radially inner side is cut out into an annular shape, a through hole 57d formed in an axially right end portion of the base portion 57b, the through hole passing through in the radial direction, and an annular projected portion 57e projecting in the radially inward direction from an inner peripheral surface of the base portion 57b on the axially right side of the through hole 57d. The CS valve element 57 is biased to the axially right side which is the valve opening direction of the CS valve 56 by the coil spring 58 fitted into the attachment portion 57c. The through hole 57d has the substantially same opening area as the Pc port 13 formed in the valve housing 10, and is arranged so that an axial position corresponds to the PC port 13.

The end surface portion 57a to be connected to and separated from the CS valve seat 11a formed on the axially right end surface of the partition adjusting member 11 is formed in an axially left end of the attachment portion 57c in the CS valve element 57. Further, on the axially opposite side of the end surface portion 57a, that is, in an axially right end of the base portion 57b, an end surface portion 57f capable of being abutted with an inner surface of the pressure sensitive chamber 60 in the valve housing 10 at the time of opening the CS valve 56 is formed.

The annular projected portion 57e of the CS valve element 57 is formed at a position between the Pd port 12 and the Pc port 13 in the valve housing 10, and an axially right end surface of the annular projected portion 57e forms a receiving surface 57h extending in the radial direction. An inner diameter of the annular projected portion 57e is formed to be smaller than an outer diameter of the large diameter portion 52b of the pressure sensitive valve member 52, and larger than an outer diameter of the middle diameter portion 52c.

The capacity control valve V has a structure that the pressure sensitive body 61, the CS valve element 57, and the coil spring 58 are inserted into the pressure sensitive chamber 60 from an axially left end of the valve housing 10 and then the partition adjusting member 11 is press-fitted and fixed. Thus, assembling is easy.

Next, actions of the capacity control valve V, mainly actions of opening and closing the main valve 50 and the CS valve 56 will be described.

First, an energized state of the capacity control valve V will be described. As shown in FIGS. 2 and 3, in the capacity control valve V, in an energized state (that is, at the time of normal control, at the time of so-called duty control), by pulling the movable iron core 84 to the center post 82 side, that is, to the axially left side by electromagnetic force generated by applying an electric current to the solenoid 80, moving the drive rod 83, the main/auxiliary valve element 51 and the pressure sensitive valve member 52 fixed to the movable iron core 84 to the axially left side together, and pressing and contracting the pressure sensitive body 61 to the axially left side, the axially right end 51b of the main/auxiliary valve element 51 is separated from the auxiliary valve seat 82a and the auxiliary valve 53 is opened, and the axially left end 51a of the main/auxiliary valve element 51 is seated on the main valve seat 10a and the main valve 50 is closed.

In the capacity control valve V, in an energized state, the CS valve element 57 is biased to the axially right side by the coil spring 58, the end surface portion 57a of the CS valve element 57 is separated from the CS valve seat 11a of the partition adjusting member 11, and the CS valve 56 is opened.

Next, a non-energized state of the capacity control valve V will be described. As shown in FIG. 4, in the capacity control valve V, in a non-energized state, by pressing the movable iron core 84 to the axially right side by bias force of the coil spring 85 and the bias force of the coil spring 63 and the bellows core 62, the drive rod 83, the main/auxiliary valve element 51, and the pressure sensitive valve member 52 are moved to the axially right side, the axially right end 51b of the main/auxiliary valve element 51 is seated on the auxiliary valve seat 82a, the axially left end 51a of the main/auxiliary valve element 51 is separated from the main valve seat 10a, and the main valve 50 is opened.

In such a way, in a non-energized state of the capacity control valve V, the fluid in the discharge chamber 2 of the variable displacement compressor M flows from the discharge chamber 2 into the control chamber 4 via the capacity control valve V by opening the main valve 50. This is because the discharge pressure Pd is higher than the control pressure Pc.

In a non-energized state of the capacity control valve V, the CS valve element 57 is pressed to the axially left side by the dynamic pressure generated by the receiving surface 57$h$ receiving a flow of the discharge fluid (shown by solid arrows in FIG. 4) which flows toward the Pc port 13 through the main valve 50. Thereby, the end surface portion 57$a$ of the CS valve element 57 is seated on the CS valve seat 11$a$ of the partition adjusting member 11, and the CS valve 56 is closed. The CS valve 56 is not limited to completely close a part between the end surface portion 57$a$ of the CS valve element 57 and the CS valve seat 11$a$ of the partition adjusting member 11 but may be formed to constrict a flow of the fluid running from the Pc port 13 to the first Ps port 14.

Although not shown in the figure for convenience of description, not only in a non-energized state of the capacity control valve V but even in a state where the main valve 50 is slightly opened in an intermediary control region at the time of normal control of the capacity control valve V, the CS valve 56 may be closed by the dynamic pressure of the discharge fluid flowing toward the Pc port 13 through the main valve 50.

According to this, in the capacity control valve V of the present embodiment, at the time of normal operation after start-up of the variable displacement compressor M, and at the time of opening the main valve 50, regarding the CS valve 56, force of moving the CS valve element 57 to the axially left side against the bias force of the coil spring 58 (shown by a white arrow in FIG. 4) is applied by the dynamic pressure of the discharge fluid flowing toward the PC port 13 through the main valve 50, the CS valve 56 is closed, and the control fluid of the control pressure Pc from the inside of the pressure sensitive chamber 60 is not discharged from the first Ps port 14. Thus, control precision of the control pressure Pc at the time of normal control is high and energy efficiency is excellent.

The Pc port 13 is always in a state capable of communicating with the main valve 50 by the through hole 57$d$ provided in the CS valve element 57. The Pd port 12 and the Pc port 13 are in a communication state at the time of opening the main valve 50 in a non-energized state of the capacity control valve V. Thus, it is possible to reliably provide communication between the discharge chamber 2 and the control chamber 4.

The CS valve 56 is formed by the substantially cylindrical CS valve element 57 and the coil spring 58 that biases the CS valve element 57 in the valve opening direction. Thus, it is possible to compactly form the capacity control valve V having the CS valve 56.

In addition, as shown in FIG. 3, it is possible to maintain the control pressure Pc and the suction pressure Ps at the same pressure by opening the CS valve 56 at the time of closing the main valve 50. Thus, it is possible to maintain a state where the control chamber 4 has the maximum capacity and enhance operation efficiency. It is also possible to adjust and balance the pressure between the suction chamber 3 and the control chamber 4 on the capacity control valve V side. Thus, it is possible to exclude a communication passage providing direct communication between the control chamber 4 and the suction chamber 3 in the variable displacement compressor M and a fixed orifice.

The CS valve element 57 has the receiving surface 57$h$ extending in the radial direction to cross the flowing direction of the discharge fluid. Thus, the dynamic pressure is more easily generated by the discharge fluid flowing toward the Pc port 13 through the main valve 50 at the time of opening the main valve 50.

Regarding the CS valve element 57, the inner diameter of the annular projected portion 57$e$ is formed to be smaller than the outer diameter of the large diameter portion 52$b$ of the stepped cylindrical pressure sensitive valve member 52, and larger than the outer diameter of the middle diameter portion 52$c$. Thereby, while increasing an area of the receiving surface 57$h$, it is possible to sufficiently ensure a sectional area of the flow passage of the discharge fluid flowing toward the Pc port 13 through a part between an inner peripheral surface of the annular projected portion 57$e$ and an outer peripheral surface of the middle diameter portion 52$c$ of the pressure sensitive valve member 52.

The CS valve element 57 has the end surface portion 57$a$ to be connected to and separated from the CS valve seat 11$a$ of the partition adjusting member 11, and when biased in the valve opening direction of the CS valve 56, the end surface portion 57$f$ on the axially opposite side of the end surface portion 57$a$ is abutted with the inner surface of the valve housing 10. Thereby, it is possible to set the maximum opening area of the CS valve 56 by abutment of the CS valve element 57 with the inner surface of the valve housing 10. Thus, it is possible to simplify a structure of the CS valve 56.

An outer peripheral surface of the CS valve element 57 is guided by an inner peripheral surface of the guide hole 10$d$ of the valve housing 10. Thereby, it is possible to stably perform actions of opening and closing the CS valve 56. Thus, it is possible to further simplify the structure of the CS valve 56.

The capacity control valve V includes the pressure sensitive valve 54 to be opened and closed by the suction pressure Ps, and the intermediary communication passage 55 capable of providing communication between the Pc port 13 and the second Ps port 15 by opening and closing the pressure sensitive valve 54 is formed in the main/auxiliary valve element 51 and the pressure sensitive valve member 52. Thus, when the suction pressure Ps in the intermediary communication passage 55 is high, the pressure sensitive valve 54 is opened and the Pc port 13 communicates with the second Ps port 15 via the intermediary communication passage 55. Thus, it is possible to promptly discharge the liquid coolant of the control chamber 4 to the suction chamber 3 at the time of start-up of the variable displacement compressor M. Thereby, responsiveness at the time of start-up of the variable displacement compressor M is excellent.

By individually providing the first Ps port 14 forming a flow passage to be opened and closed by the CS valve 56 (shown by a solid arrow in FIG. 3), and the second Ps port 15 forming a flow passage to be opened and closed by the pressure sensitive valve 54 (not shown) in the valve housing 10, it is possible to simplify a structure of the valve housing 10.

Second Embodiment

Figure 5:
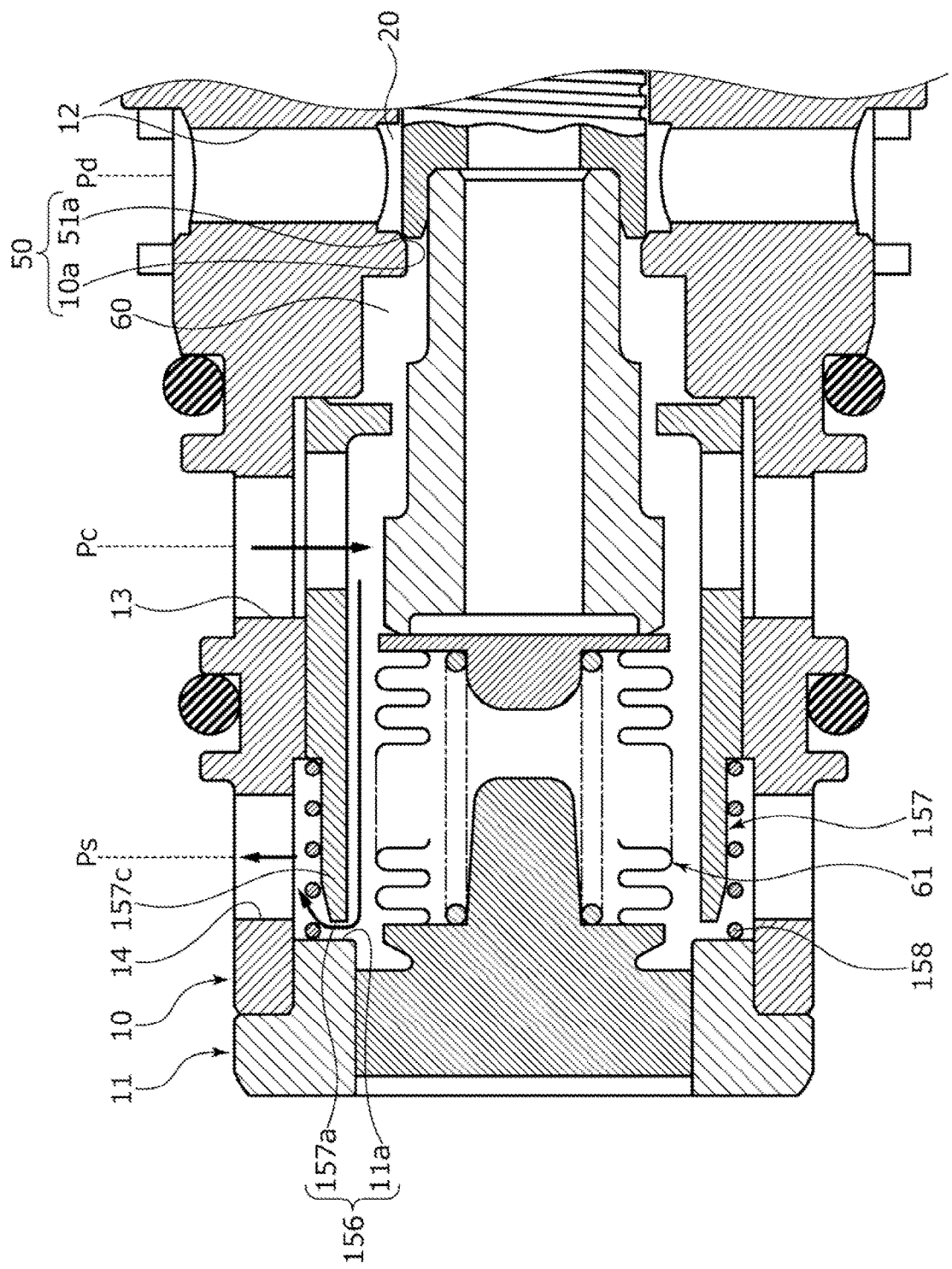
FIG. 5 is an enlarged sectional view showing a state where a main valve is closed and a CS valve is opened in an energized state (at the time of normal control) of a capacity control valve according to a second embodiment of the present invention.

Next, a capacity control valve according to a second embodiment will be described with reference to FIG. 5. The same constituent parts as the constituent parts shown in the above embodiment will be given the same reference signs and duplicated description will be omitted.

A capacity control valve V in the second embodiment will be described. As shown in FIG. 5, a CS valve element 157 is formed in a substantially cylindrical shape, and arranged in a concentric manner in a pressure sensitive chamber 60 on the radially outer side of a pressure sensitive body 61. A coil spring 158 serving as a spring is fitted onto a small-diameter attachment portion 157c formed in an axially left end portion of the CS valve element 157.

Next, an opening and closing mechanism serving as a differential pressure valve of a CS valve 156 will be described. In a state where pressure applied to the CS valve element 157 which is arranged in the pressure sensitive chamber 60 from both the axial sides are balanced by balancing control pressure Pc of a control chamber 4 and suction pressure Ps of a suction chamber 3 to provide pressure equalization, a pressure receiving area for pressure applied to the axially right side which is the valve opening direction of the CS valve 156 and a pressure receiving area for pressure applied to the axially left side which is the valve closing direction are formed to be the substantially same as each other. Thus, an influence of the pressure applied to the CS valve element 157 from both the axial sides is cancelled, the CS valve element 157 receives bias force of the coil spring 158 and is moved to the axially right side, an end surface portion 157a of the CS valve element 157 is separated from a CS valve seat 11a of a partition adjusting member 11, and the CS valve 156 is opened. In the present embodiment, there may be some pressure width for differential pressure between the control pressure Pc and the suction pressure Ps.

Meanwhile, in a state where the suction pressure Ps of the suction chamber 3 is lower than the control pressure Pc of the control chamber 4, differential pressure is generated in the axial direction of the CS valve element 157 by a pressure difference between the control pressure Pc and the suction pressure Ps, the pressure applied to the CS valve element 157 from the axially left side becomes smaller than the pressure applied from the axially right side, and force of moving to the axially left side is applied to the CS valve element 157.

According to this, in the capacity control valve V of the present embodiment, the CS valve 156 also serves as the differential pressure valve between the suction pressure Ps and the control pressure Pc. Thus, at the time of opening a main valve 50, regarding the CS valve 156, in addition to dynamic pressure of a discharge fluid flowing toward a PC port 13 through the main valve 50, the differential pressure between the control pressure Pc and the suction pressure Ps is applied in the valve closing direction of the CS valve 156. Thus, it is possible to reliably operate the CS valve 156.

Further, in the capacity control valve V of the present embodiment, in a state where the control chamber 4 has the maximum capacity, by closing the main valve 50 and opening the CS valve 156, the control pressure Pc and the suction pressure Ps applied to the CS valve element 157 from both the axial sides are balanced and an influence of the pressure applied to the CS valve element 157 from both the axial sides is cancelled, so that it is possible to more easily open the CS valve 156. Thus, it is possible to more easily maintain a state where the control chamber 4 has the maximum capacity and enhance operation efficiency.

The embodiments of the present invention are described above with the drawings. However, specific configurations are not limited to these embodiments but the present invention includes changes and additions within the range not departing from the scope of the present invention.

For example, in the above embodiments, the pressure sensitive valve 54 formed by the pressure sensitive body 61 and the pressure sensitive valve member 52 may not be provided. In this case, there is no need for the hollow hole inside the main/auxiliary valve element 51 forming the intermediary communication passage 55 and the second Ps port 15 of the valve housing 10.

The above embodiments describe the mode that the Pc port 13 is always in a state capable of communicating with the main valve 50 by the through hole provided in the CS valve element. However, the present invention is not limited to this but communication between the Pc port 13 and the main valve 50 may be opened and closed by, for example, an action of the CS valve element without providing a through hole in the CS valve element.

In the above embodiments, the auxiliary valve 53 is not necessarily provided. The axially right end 51b of the main/auxiliary valve element 51 is only required to function as a support member that receives a load in the axial direction and a sealing function is not necessarily required.

The CS valve and the Pc port 13 may be provided in the second valve chamber 30.

The second valve chamber 30 may be provided on the axially opposite side of the solenoid 80 and the pressure sensitive chamber 60 may be provided on the solenoid 80 side.

The coil springs 58, 158 are not limited to a compression spring but may be an extension spring or may be formed in a shape other than the coil shape.

The coil spring may not be used inside the pressure sensitive body 61.

REFERENCE SIGNS LIST

1 Casing
2 Discharge chamber
3 Suction chamber
4 Control chamber
10 Valve housing
10a Main valve seat
11 Partition adjusting member
11a CS valve seat
12 Pd port (discharge port)
13 Pc port (control port)
14 First Ps port (suction port)
15 Second Ps port (suction port different from the above suction port)
20 First valve chamber
30 Second valve chamber
50 Main valve
51 Main/auxiliary valve element (main valve element)
51a Axially left end
51b Axially right end
52 Pressure sensitive valve member
52a Pressure sensitive valve seat
53 Auxiliary valve
54 Pressure sensitive valve (pressure drive valve)
55 Intermediary communication passage
56 CS valve
57 CS valve element
57a End surface portion
57f End surface portion
57h Receiving surface
58 Coil spring (spring)
60 Pressure sensitive chamber
61 Pressure sensitive body
62 Bellows core
63 Coil spring
70 Cap
70a Sealing surface
80 Solenoid
82 Center post 82a Auxiliary valve seat
83 Drive rod (rod)
156 CS valve
157 CS valve element
157a End surface portion
157c Attachment portion
158 Coil spring (spring)
Pc Control pressure
Pd Discharge pressure
Ps Suction pressure
V Capacity control valve

The invention claimed is:

1. A capacity control valve comprising:
a valve housing provided with a discharge port through which a discharge fluid of discharge pressure passes, a suction port through which a suction fluid of suction pressure passes, and a control port through which a control fluid of control pressure passes;
a rod configured to be driven by a solenoid;
a main valve formed by a main valve seat and a main valve element and configured for opening and closing a communication between the discharge port and the control port in accordance with a movement of the rod; and
a CS valve provided between the control port and the suction port and controlled by a dynamic pressure of a fluid flowing from the discharge port to the control port at an opening state of the main valve, wherein
the CS valve includes a cylindrical CS valve element, and a spring configured to bias the CS valve element in a valve opening direction of the CS valve,
the CS valve element has a receiving surface extending in a radial direction to receive the dynamic pressure,
the CS valve element has a first end surface portion and a second end surface portion on an axially opposite side of the first end surface portion, the first end surface portion is brought into contact with and separated from a CS valve seat formed in the valve housing, and,
when biased in the valve opening direction of the CS valve, the second end surface portion is abutted with an inner surface of the valve housing.

2. The capacity control valve according to claim 1, wherein
the control port communicates with a space which is opened and closed by the main valve.

3. The capacity control valve according to claim 1, wherein
the CS valve also serves as a differential pressure valve provided between the suction pressure and the control pressure.

4. The capacity control valve according to claim 2, wherein
the CS valve also serves as a differential pressure valve provided between the suction pressure and the control pressure.

* * * * *